(12) United States Patent
Tucker et al.

(10) Patent No.: US 11,056,746 B2
(45) Date of Patent: Jul. 6, 2021

(54) BATTERY CARTRIDGE FOR VEHICLE AND LOCKING MECHANISM

(71) Applicant: XING POWER INC., Victoria (SC)

(72) Inventors: Kareem Azizi Tucker, Taipei (TW); Yu-Chung Lin, Taipei (TW)

(73) Assignee: XING POWER INC., Victoria (SC)

( * ) Notice: Subject to any disclaimer, the term of this patent is extended or adjusted under 35 U.S.C. 154(b) by 15 days.

(21) Appl. No.: 16/391,568

(22) Filed: Apr. 23, 2019

(65) Prior Publication Data
US 2020/0343500 A1 Oct. 29, 2020

(51) Int. Cl.
*H01M 50/20* (2021.01)
*B60L 53/80* (2019.01)

(52) U.S. Cl.
CPC ............. *H01M 50/20* (2021.01); *B60L 53/80* (2019.02); *B60Y 2200/91* (2013.01); *B60Y 2400/112* (2013.01); *H01M 2220/20* (2013.01)

(58) Field of Classification Search
CPC ........... H01M 2/1083; H01M 2220/20; H01M 2/1077; B60L 53/80; B60Y 2400/112; B60Y 2200/91; B60K 1/04; B60K 2001/0438; B60K 2001/0472; Y02E 60/10

See application file for complete search history.

(56) References Cited

U.S. PATENT DOCUMENTS

2012/0291250 A1* 11/2012 Escande ................. B60L 53/80
29/402.08

FOREIGN PATENT DOCUMENTS

EP        2374646 A2 * 10/2011 ............... B60K 1/04
EP        3087625 B1 *  9/2018 ............... B60K 1/04

* cited by examiner

*Primary Examiner* — Wyatt P McConnell
(74) *Attorney, Agent, or Firm* — Hamre, Schumann, Mueller & Larson, P.C.

(57) ABSTRACT

A battery cartridge for a vehicle includes a carrier frame, a battery assembly disposed on the carrier frame, at least one locking mechanism disposed between the vehicle and the carrier frame to permit the battery cartridge to be locked to the vehicle. When a pressure from a pressurized fluid is applied to the locking mechanism, the battery cartridge is permitted to be unlocked from the vehicle.

4 Claims, 9 Drawing Sheets

BATTERY CARTRIDGE FOR VEHICLE AND LOCKING MECHANISM

FIELD

The disclosure relates to a battery cartridge, more particularly to a battery cartridge which can be locked a vehicle and which can be unlocked from the vehicle by means of a pressurized fluid.

BACKGROUND

U.S. Pat. No. 8,013,571 B2 discloses a convention method for exchanging a discharged battery. In this method, at the battery exchange station, the discharged battery is removed and a charged battery is inserted into an electric vehicle. The battery is inserted and removed along a vertical axis, i.e., into and out of the bottom of the vehicle. The battery exchange system is located in a service bay under the vehicle. A sliding door system creates an opening above the service bay. A vehicle is received over the sliding door system, such that at least one wheel of the vehicle rests on the conveyor system. The door slides in a first direction while allowing the conveyor system to slide in a direction opposite the first direction. The conveyor system also supports the at least one wheel of the vehicle while the door and conveyor slide in opposite directions. The sliding of the door and the sliding of the conveyor system occur at least partially simultaneously.

U.S. patent application publication no. 2016/0107619 A1 discloses a conventional battery pack lift system which includes: a frame having nutrunners mounted thereon according to a battery pack fastener pattern for a vehicle; a lift configured to raise and lower the frame with regard to the vehicle; a first air bearing positioned between the frame and the lift, the first air bearing configured to allow relative movement between the frame and the lift; and a second air bearing positioned on the frame, the second air bearing configured to allow relative movement between a battery pack and the frame.

SUMMARY

An object of the disclosure is to provide a novel battery cartridge for a vehicle. With the provision of the novel battery cartridge, the battery cartridge can be easily released from the vehicle using a pressurized fluid.

According to the disclosure, a battery cartridge for a vehicle is provided. The vehicle defines therein a battery accommodation compartment. The battery cartridge includes a carrier frame, a battery assembly, and at least one locking mechanism. The carrier frame includes a first frame surface. The battery assembly is disposed on the first frame surface, and has a profile to be received in the battery accommodation compartment when the battery cartridge is disposed to be mounted to the vehicle. The locking mechanism is to be disposed between the vehicle and the first frame surface to permit the battery cartridge to be locked to the vehicle, and is configured such that when a pressure from a pressurized fluid is applied to the locking mechanism, the battery cartridge is permitted to be unlocked from the vehicle.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
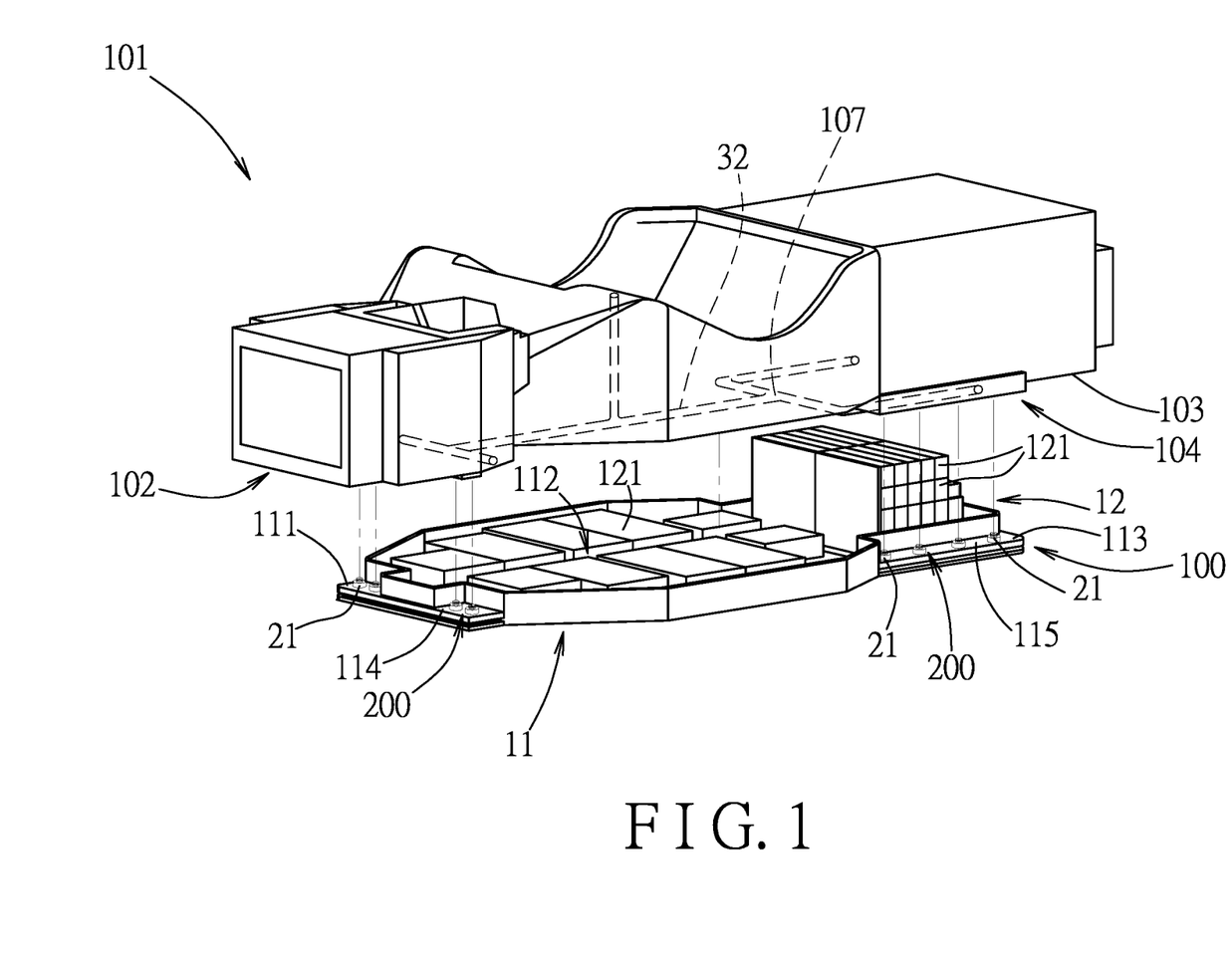
FIG. 1 is an exploded perspective view of a vehicle with a battery cartridge according to an embodiment of the disclosure.
Figure 2:
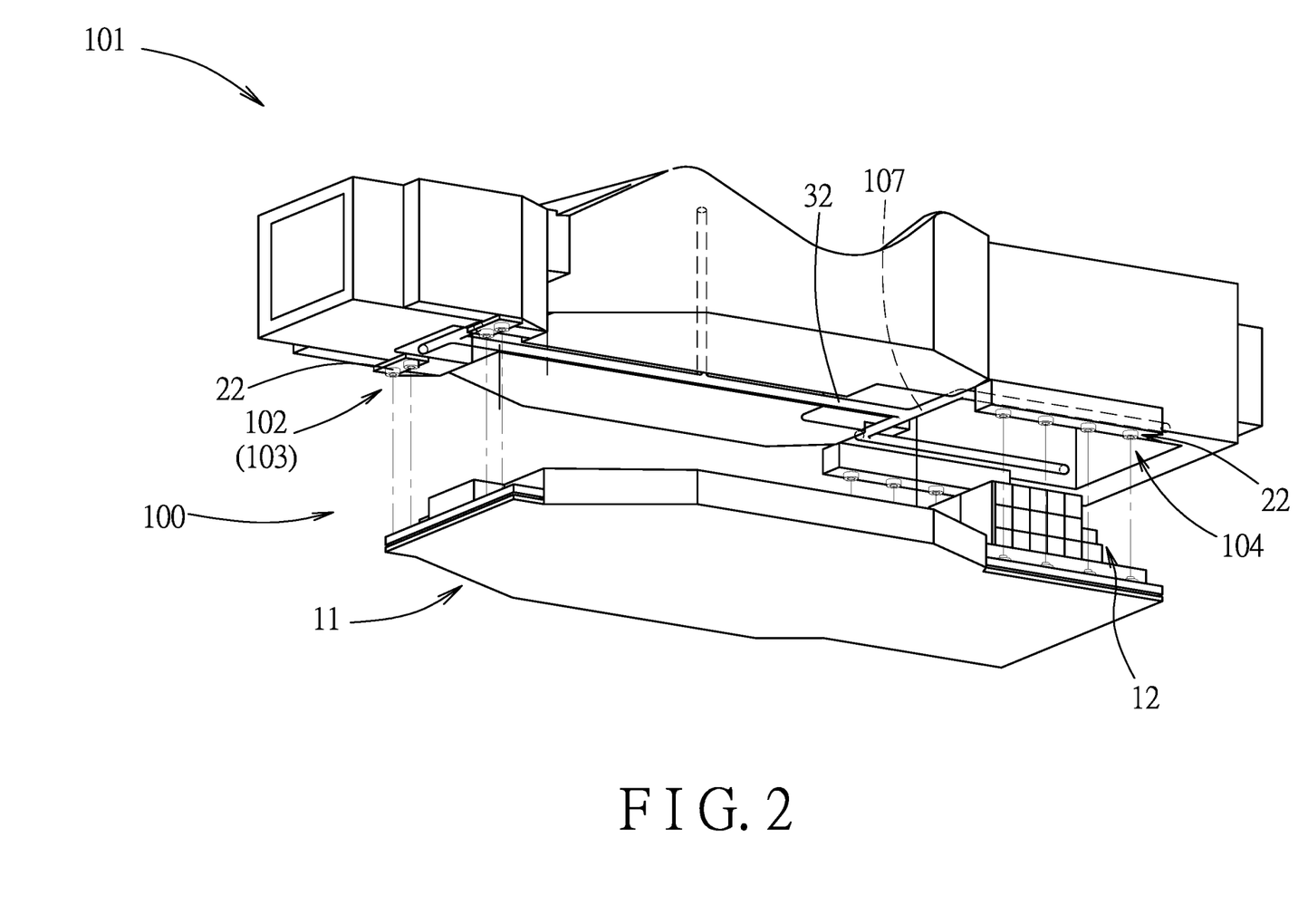
FIG. 2 is similar to FIG. 1 but viewed from a bottom side.

Referring to FIGS. 1 and 2, a battery cartridge 100 for a vehicle 101 according to an embodiment of the disclosure is shown. The vehicle 101 includes a chassis 102 with a lower chassis surface 103 and defines a battery accommodation compartment 104 which is open to the lower chassis surface 103. Although, in an embodiment shown in FIGS. 1 and 2, the battery accommodation compartment 104 is located on a bottom side of the vehicle, in other embodiments, the battery accommodation compartment may be located on a top side or a lateral side of the vehicle based on designs.

The battery cartridge 100 includes a carrier frame 11, a battery assembly 12, and at least one locking mechanism 200.

In an embodiment, the battery cartridge 100 is a heavy-duty battery cartridge for an electric-powered vehicle.

The carrier frame 11 includes an upper (first) frame surface 111. In an embodiment shown in FIG. 1, the first frame surface 111 has a central region 112 and a peripheral region 113 around the central region 112. The peripheral region 113 has a front area 114 and a rear area 115.

The battery assembly 12 is disposed on the first frame surface 111, and has a profile to be received in the battery accommodation compartment 104 when the battery cartridge 100 is disposed to be mounted to the chassis 102 of the vehicle 101. In an embodiment shown in FIG. 1, the battery assembly 12 includes a plurality of battery modules 121, and is configured to be secured on the central region 112.

The locking mechanism 200 is to be disposed between the lower chassis surface 103 of the vehicle 101 and the first frame surface 111 to permit the battery cartridge 100 to be locked to the chassis 102 of the vehicle 101, and is configured such that when a pressure from a pressurized fluid is applied to the locking mechanism 200, the battery cartridge 100 is permitted to be unlocked from the chassis 102 of the vehicle 101.

In an embodiment, pressurized air is used to serve as the pressurized fluid. Alternatively, a hydraulic fluid may be used to serve as the pressurized fluid.

In an embodiment shown in FIGS. 3 to 6, the locking mechanism 200 includes a male member 21, a female member 22, and at least one retaining member 23.

Figure 3:
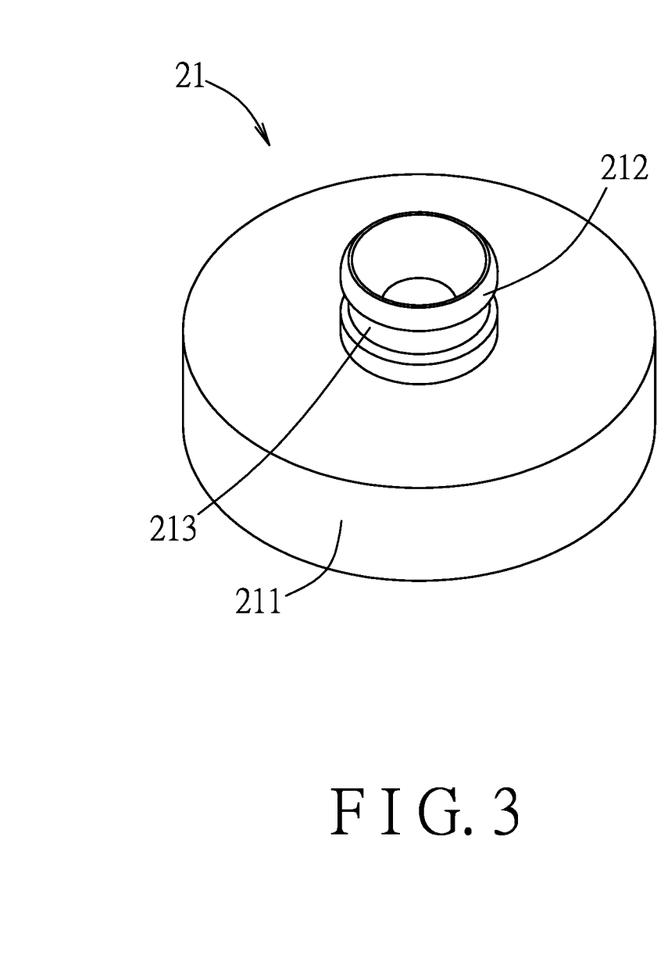
FIG. 3 is a perspective view of a male member of a locking mechanism used in the battery cartridge.

The male member 21 includes a base body 211 and a plug 212. The base body 211 is to be mounted on the one of the lower chassis surface 103 of the vehicle 101 and the first frame surface 111. The plug 212 extends from the base body 211 along an axial axis (A), and has an outer peripheral surface which surrounds the axial axis (A) and which is formed with a retained groove 213.

Figure 5:
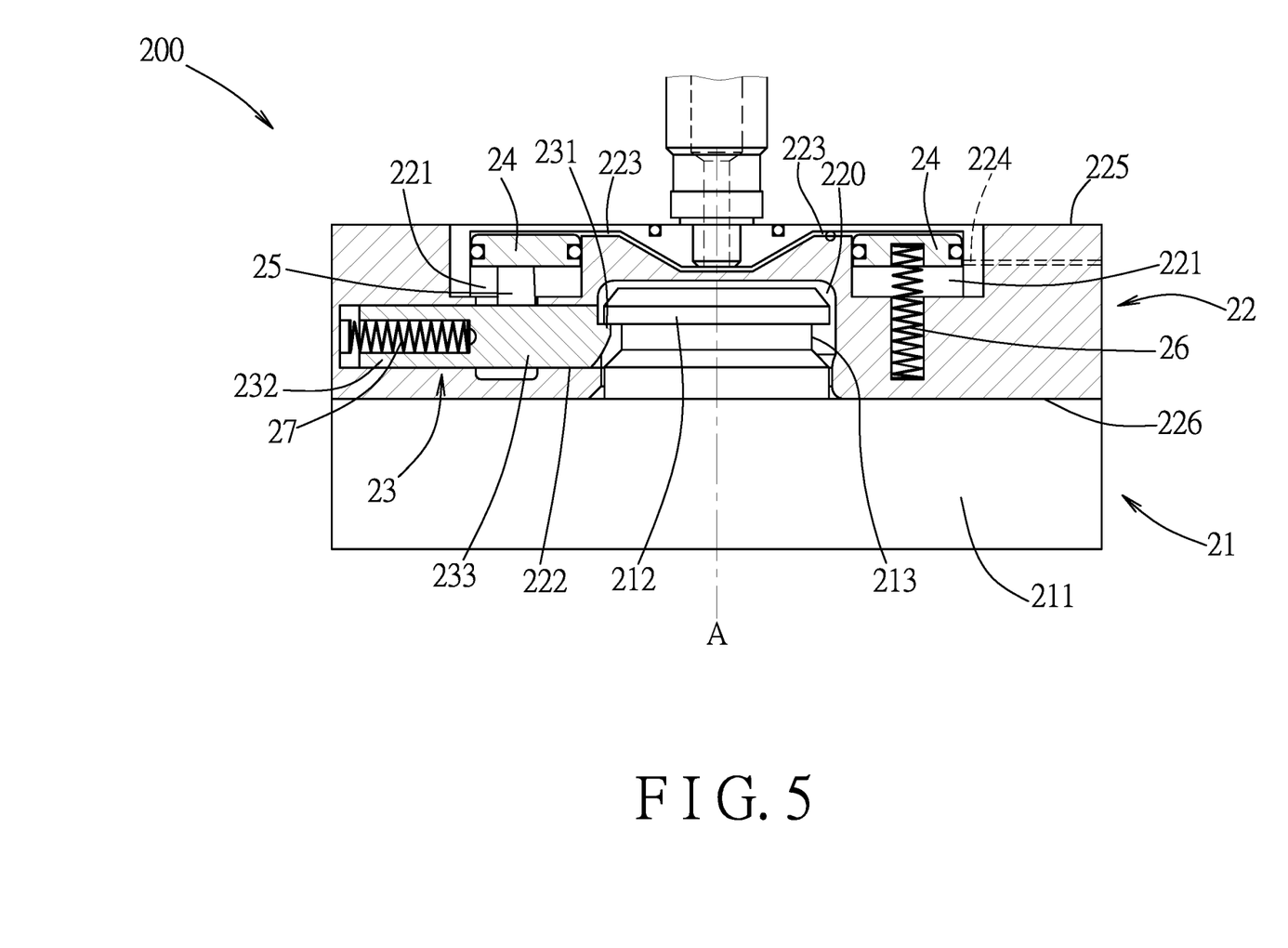
FIG. 5 is a partial cross-sectional view of the locking mechanism.
Figure 6:
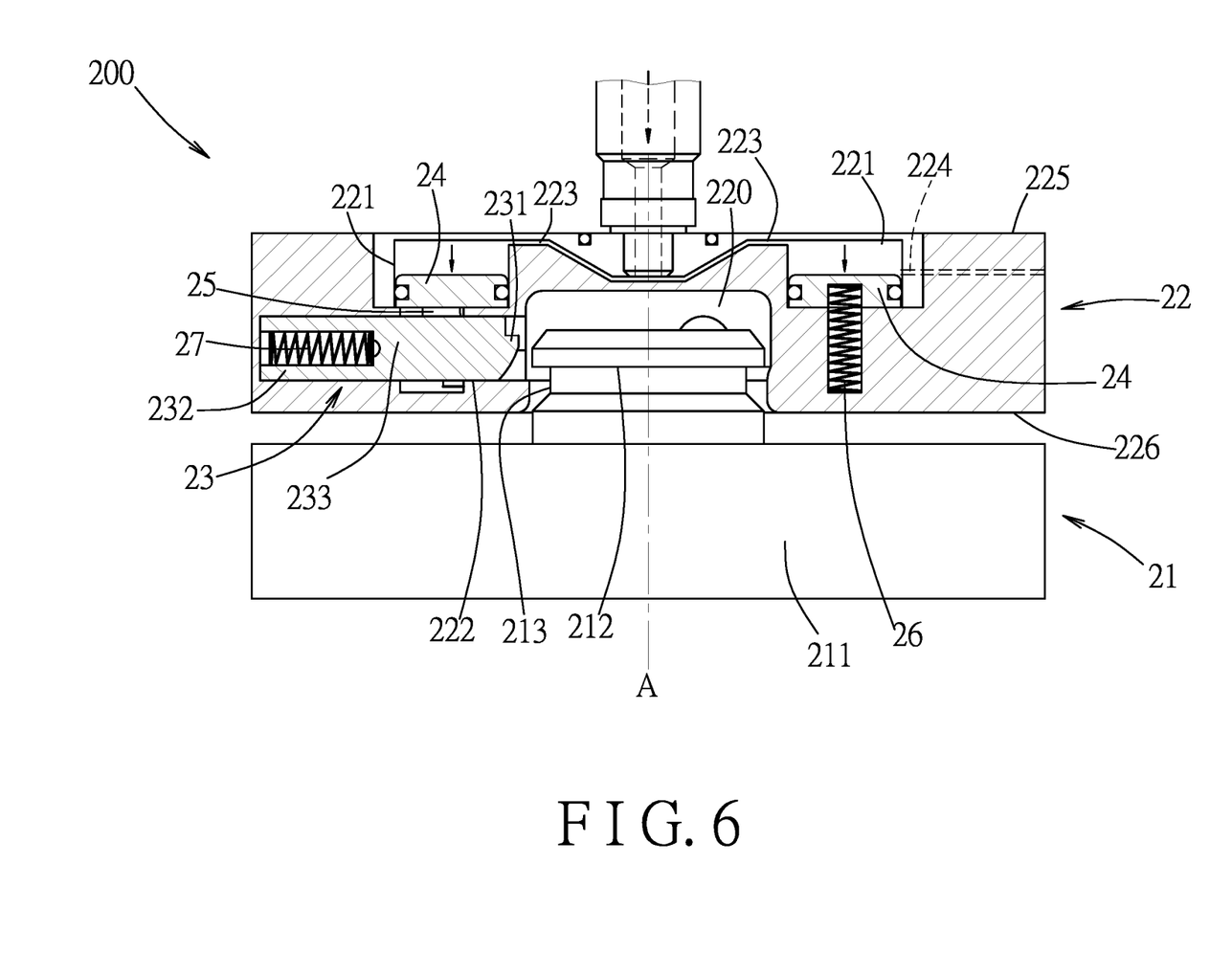
FIG. 6 is similar to FIG. 5 but illustrating when a pressurized fluid is applied.

In an embodiment shown in FIGS. 5 and 6, the retained groove 213 extends in a circumferential direction about the axial axis (A).

Figure 4:
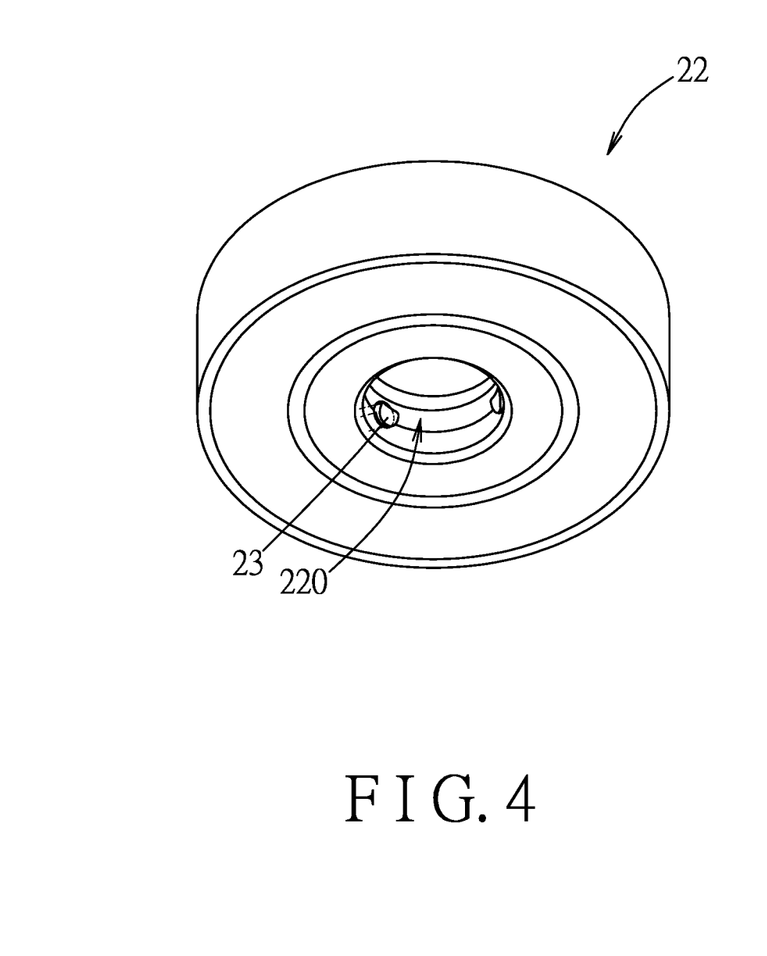
FIG. 4 is a perspective view of a female member of the locking mechanism.

The female member 22 is to be mounted on the other one of the lower chassis surface 103 of the vehicle 101 and the first frame surface 111, and has a socket hole 220 configured to permit insertion of the plug 212. The female member 22 defines therein at least one inner chamber 221 with a fluid inlet 223 and a fluid outlet 224. The pressurized fluid from a pressurized-fluid source 105 (only shown in FIG. 8) is permitted to be introduced into the inner chamber 221 through the fluid inlet 223. The pressurized fluid is permitted to be discharged from the inner chamber 221 through the fluid outlet 224. The female member 22 has at least one passage 222 which is formed inside the socket hole 220, and which extends radially to communicate with the inner chamber 221.

In an embodiment shown in FIGS. 1 to 6, the base body 211 of the male member 21 is mounted on the peripheral region 113 of the first frame surface 111. The female member 22 has a first major surface 225 which is to be mounted on the lower chassis surface 103 of the vehicle 101, and a second major surface 226 which is opposite to the first major surface 225 and which confronts the base body 211.

The retaining member 23 is disposed in the passage 222, and is configured such that once the plug 212 is inserted into the socket hole 220, the retaining member 23 is brought into retaining engagement with the plug 212, and such that once the pressurized fluid is introduced into the inner chamber 221, the retaining member 23 is permitted to release from the retaining disengage with the plug 212.

Figure 7:
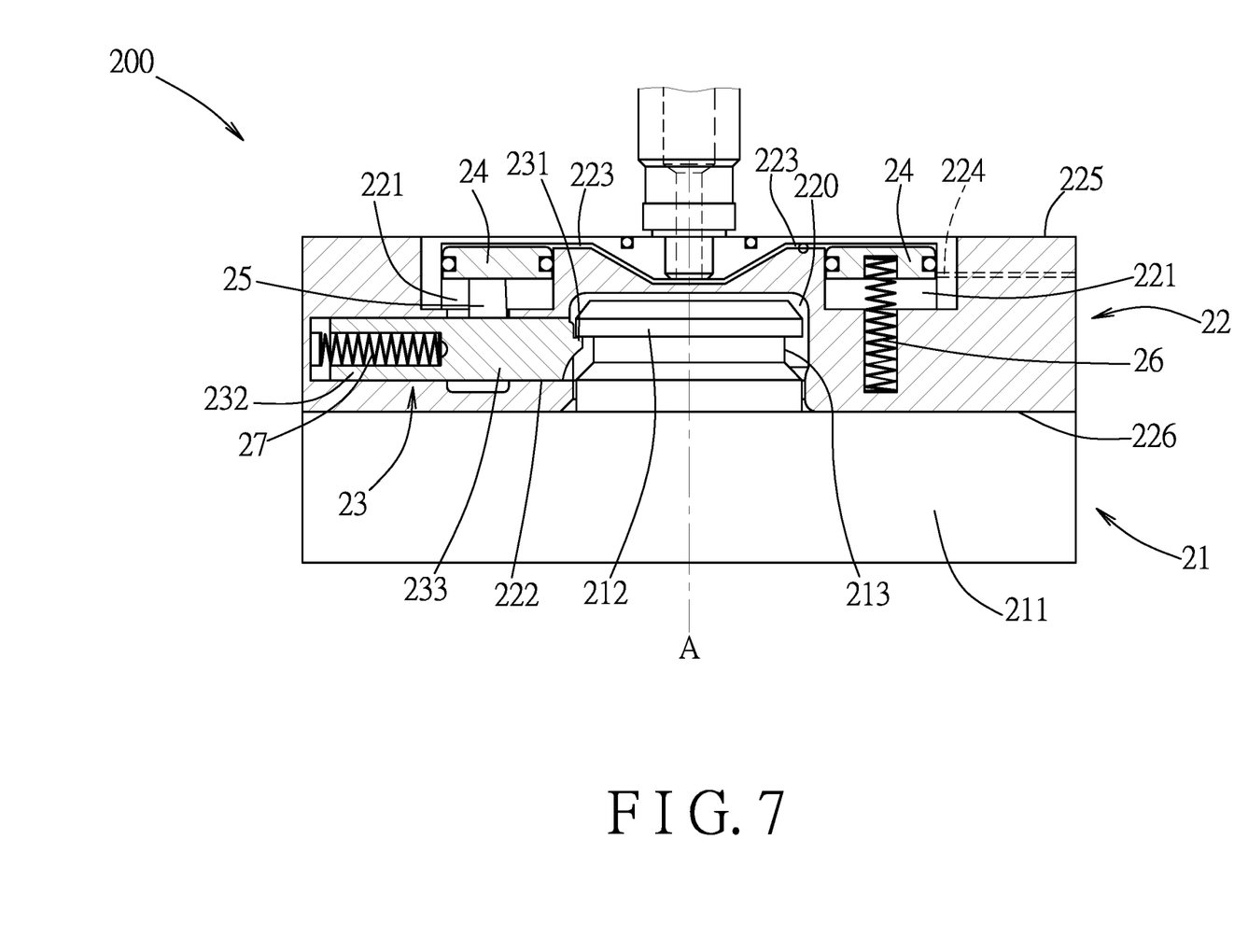
FIG. 7 is a partial cross-sectional view similar to FIG. 5 but illustrating another configuration of a retaining member in the female member of the locking mechanism.

In an embodiment shown in FIGS. 5 and 6, the retaining member 23 has a first end 231 and a second end 232 which are radially opposite to each other. The first end 231 of the retaining member 23 has a truncated wedge cross section. Alternatively, the first end 231 of the retaining member 23 may have a V-shaped cross section shown in FIG. 7.

The retaining member 23 is movable radially between an inward position and an outward position. In the inward position, as shown in FIG. 5, the first end 231 is engaged in the retained groove 213 of the plug 212 so as to retain the plug 212 inside the socket hole 220 to thereby permit the battery cartridge 100 to be locked to the chassis 102 of the vehicle 101. In the outward position, as shown in FIG. 6, the first end 231 is retracted in the passage 222 so as to permit removal of the plug 212 from the socket hole 220, to thereby allow the battery cartridge 100 to be unlocked from the chassis 102 of the vehicle 101. In an embodiment shown in FIGS. 5 and 6, the retaining member 23 is elongated, and the second end 232 is disposed in the inner chamber 221.

In an embodiment shown in FIGS. 5 and 6, the locking mechanism 200 further includes at least one piston 24, at least one actuator 25, and at least one first biasing member 26.

The piston 24 is disposed in the inner chamber 221, and is configured to be forced by the pressure from the pressurized fluid to shift from a first position to a second position. In the first position, as shown in FIG. 5, the fluid outlet 224 is not in fluid communication with the fluid inlet 223. In the second position, as shown in FIG. 6, the fluid outlet 224 is in fluid communication with the fluid inlet 223.

The actuator 25 extends from the piston 24 to move therewith, and is configured such that when the piston 24 is displaced to the second position, the actuator 25 is moved with the piston 24 to permit movement of the retaining member 23 to the outward position.

The first biasing member 26 is disposed in the inner chamber 221 to bias the piston 24 to the first position.

In an embodiment shown in FIGS. 5 and 6, the locking mechanism 200 further includes at least one second biasing member 27 which is disposed in the inner chamber 221 to bias the retaining member 23 to the inward position so as to permit the first end 231 of the retaining member 23 to be brought into clicking engagement with the retained groove 213 in response to insertion of the plug 212 into the socket hole 220.

In an embodiment shown in FIGS. 5 and 6, the actuator 25 is coupled to an intermediate segment 233 of the retaining member 23 between the first and second ends 231, 232 such that when the piston 24 is displaced to the second position (FIG. 6), the retaining member 23 is moved by the actuator 25 to the outward position against a biasing force of the second biasing member 27.

In an embodiment shown in FIGS. 5 and 6, the female member 22 defines a plurality of the inner chambers 221 around the axial axis (A), and has a plurality of the passages 222 (only one is shown) displaced from each other about the axial axis (A). The locking mechanism 200 includes a plurality of the retaining members 23 (only one is shown) which are respectively disposed in the passages 222, a plurality of the pistons 24 which are respectively disposed in the inner chambers 221, a plurality of the actuators 25 (only one is shown) which extend respectively from the pistons 24 to move therewith, a plurality of the first biasing members 26 (only one is shown) which are disposed respectively in the inner chambers 221 to respectively bias the pistons 24 to the first position (FIG. 5), and a plurality of the second biasing members 27 (only one is shown) which are disposed respectively in the inner chambers 221 to respectively bias the retaining members 23 to the inward position (FIG. 5).

In an embodiment shown in FIGS. 1 and 2, the battery cartridge 100 includes a plurality of the locking mechanisms 200, and a manifold 32 is provided inside the vehicle 101 to form a fluid duct 107 so as to permit the pressurized fluid to be evenly distributed to the locking mechanisms 200. Alternatively, the manifold 32 may be provided inside the carrier frame 11.

The base bodies 211 of the male members 21 of the locking mechanisms 200 are mounted on the front and rear areas 114, 115, respectively. The first major surfaces 225 of the female members 22 are mounted on the lower chassis surface 103 of the vehicle 101 in positions corresponding to the male members 21. Here, the term "respectively" means that for each of the front and rear areas 114, 115, at least one of the base bodies 211 of the male members 21 of the locking mechanisms 200 is mounted thereon.

Figure 9:
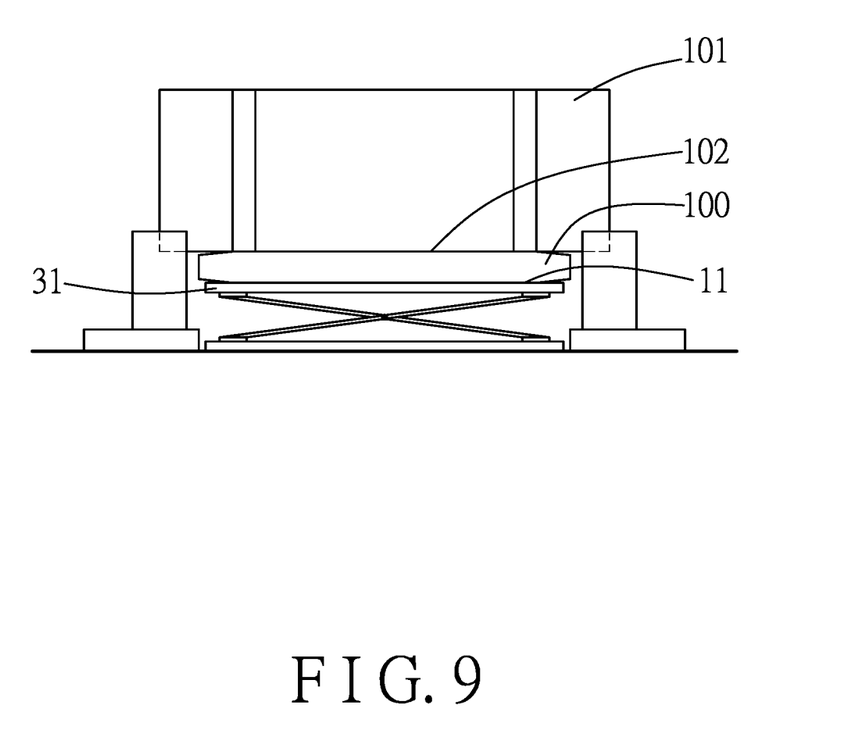
FIG. 9 is a schematic view illustrating the vehicle in a ready position for exchanging the battery cartridge.
Figure 10:
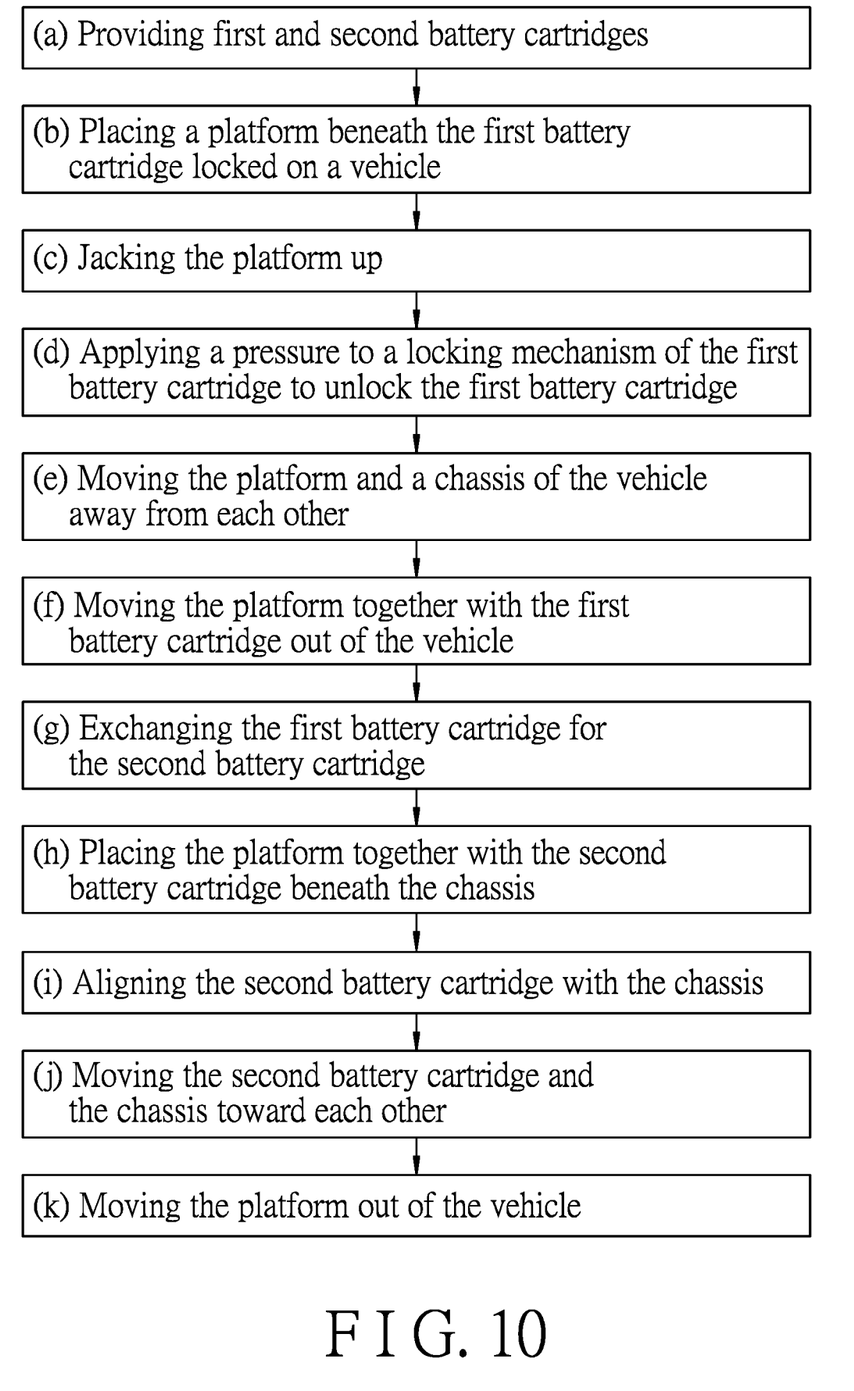
FIG. 10 is a block diagram illustrating a method for exchanging a first battery cartridge for a second battery cartridge according to an embodiment of the disclosure.

FIG. 9 illustrates a method for exchanging a first battery cartridge 100 of the vehicle 101 for a second battery cartridge 100. The method includes steps (a) to (k).

In step (a), the first and second battery cartridges 100 are provided. Each of the first and second battery cartridges 100, which is substantially the same as the above-mentioned battery cartridge 100, is permitted to be locked to the chassis 102, and is configured such that once the pressure from the pressurized fluid is applied to the locking mechanism(s) 200, the first or second battery cartridge 100 is permitted to be unlocked from the chassis 102.

In step (b), as also shown in FIG. 9, a platform 31 is placed beneath the carrier frame 11 of the first battery cartridge 100 locked on the vehicle 101.

In step (c), the platform 31 is jacked up to permit the first battery cartridge 100 to be held by the platform 31.

Figure 8:
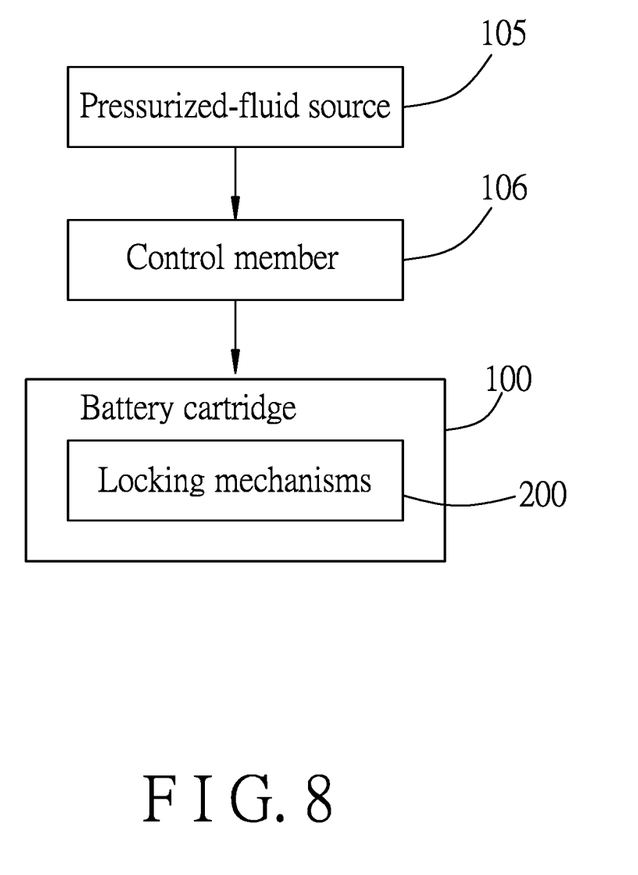
FIG. 8 is a schematic view illustrating relation among a pressurized-fluid source, a control member, and the locking mechanisms of the battery cartridge.

In step (d), the pressure from the pressurized fluid is applied to the locking mechanism 200 of the first battery cartridge 100 through the fluid duct 107 in the vehicle 101 until the first battery cartridge 100 is unlocked from the chassis 102. As illustrated in FIG. 8, a control member 106 may be disposed downstream of the pressurized-fluid source 105 and upstream of the locking mechanisms 200 to control provision or interruption of the supply of the pressurized fluid.

In step (e), the platform 31 and the chassis 102 are moved away from each other such that the first battery cartridge 100 is fully disposed beneath the chassis 102.

In step (f), the platform 31, together with the first battery cartridge 100, is moved out of the vehicle 101.

In step (g), the first battery cartridge 100 on the platform 31 is exchanged for the second battery cartridge 100.

In step (h), the platform 31, together with the second battery cartridge 100, is placed beneath the chassis 102.

In step (i), the second battery cartridge 100 is aligned with the chassis 102 to permit the second battery cartridge 100 to be locked to the chassis 102. In other words, the plug 212 is aligned with the corresponding socket hole 220.

In step (j), the second battery cartridge 100 and the chassis 102 are moved toward each other until the second battery cartridge 100 is locked to the chassis 31.

In step (k), the platform 31 is moved out of the vehicle 101.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A battery cartridge for a vehicle which defines a battery accommodation compartment, said battery cartridge comprising:

a carrier frame including a first frame surface;

a battery assembly disposed on said first frame surface, and having a profile to be received in the battery accommodation compartment when said battery cartridge is disposed to be mounted to the vehicle; and at least one locking mechanism which is to be disposed between the vehicle and said first frame surface to permit said battery cartridge to be locked to the vehicle, and which is configured such that when a pressure from a pressurized fluid is applied to said locking mechanism, said battery cartridge is permitted to be unlocked from the vehicle, wherein said locking mechanism includes a male member including a base body which is to be mounted on one of the vehicle and said first frame surface, and a plug which extends from said base body along an axial axis, a female member which is to be mounted on the other one of the vehicle and said first frame surface, and which has a socket hole configured to permit insertion of said plug, said female member defining therein at least one inner chamber with a fluid inlet through which the pressurized fluid from a pressurized-fluid source is permitted to be introduced into said inner chamber, and a fluid outlet through which the pressurized fluid is permitted to be discharged from said inner chamber, said female member having at least one passage which is formed inside said socket hole, and which extends radially to communicate with said inner chamber, and at least one retaining member disposed in said passage, and configured such that once said plug is inserted into said socket hole, said retaining member is brought into retaining engagement with said plug, and such that once the pressurized fluid is introduced into said inner chamber, said retaining member is permitted to release from the retaining engagement with said plug;

wherein said plug has an outer peripheral surface which surrounds the axial axis and which is formed with a retained groove;

wherein said retaining member has a first end and a second end which are radially opposite to each other, said retaining member being movable radially between an inward position, where said first end is engaged in said retained groove of said plug so as to retain said plug inside said socket hole to thereby permit said battery cartridge to be locked to the vehicle, and an outward position, where said first end is retracted in said passage so as to permit removal of said plug from said socket hole, to thereby allow said battery cartridge to be unlocked from the vehicle; and wherein said locking mechanism further includes at least one piston which is disposed in said inner chamber, and which is configured to be forced by the pressure from the pressurized fluid to shift from a first position, where said fluid outlet is not in fluid communication with said fluid inlet, to a second position, where said fluid outlet is in fluid communication with said fluid inlet, and at least one actuator extending from said piston to move therewith, and configured such that when said piston is displaced to the second position, said actuator is moved with said piston to permit movement of said retaining member to the outward position, and at least one first biasing member disposed in said inner chamber to bias said piston to the first position.

2. The battery cartridge according to claim 1, wherein
said first frame surface has a central region and a peripheral region around said central region;
said battery assembly includes a plurality of battery modules, and is configured to be secured onto said central region;
said base body of said male member is mounted on said peripheral region of said first frame surface; and
said female member has a first major surface which is to be mounted on the vehicle, and a second major surface which is opposite to said first major surface and which confronts said base body.

3. The battery cartridge according to claim 2, which includes a plurality of said locking mechanisms.

4. The battery cartridge according to claim 3, wherein said peripheral region has a front area and a rear area, and said base bodies of said male members of said locking mechanisms are mounted on said front and rear areas, respectively, said first major surfaces of said female members being mounted in positions corresponding to said male members.

* * * * *